(12) United States Patent
Giacalone

(10) Patent No.: US 6,298,411 B1
(45) Date of Patent: Oct. 2, 2001

(54) METHOD AND APPARATUS TO SHARE INSTRUCTION IMAGES IN A VIRTUAL CACHE

(75) Inventor: Glenn P. Giacalone, Westford, MA (US)

(73) Assignee: Compaq Computer Corporation, Houston, TX (US)

(*) Notice: Subject to any disclaimer, the term of this patent is extended or adjusted under 35 U.S.C. 154(b) by 0 days.

(21) Appl. No.: 09/225,775

(22) Filed: Jan. 5, 1999

(51) Int. Cl.$^7$ ........................................ G06F 12/08
(52) U.S. Cl. .................... 711/3; 711/125; 711/144; 711/203; 711/207; 711/209; 711/210
(58) Field of Search .................. 711/3, 203, 207, 711/210, 144, 209, 125; 709/108

(56) References Cited

U.S. PATENT DOCUMENTS

| | | | |
|---|---|---|---|
| 5,276,829 | 1/1994 | Sano | 711/210 |
| 5,623,626 | 4/1997 | Morioka et al. | 711/210 |
| 5,623,627 | 4/1997 | Witt | 711/122 |
| 5,627,987 | 5/1997 | Nozue et al. | 711/200 |
| 5,930,833 | 7/1999 | Yoshioka et al. | 711/210 |
| 5,974,438 | * 10/1999 | Neufeld | 709/104 |
| 6,122,712 | * 9/2000 | Torii | 711/141 |

OTHER PUBLICATIONS

Tullsen, D.M., Eggers, S.J. and Levy, H.M., "Simultaneous Multithreading: Maximizing On–Chip Parallelism, " Proc. 22nd Annual International Symposium on Computer Architecture, pp. 392–403, Jun. 1995.

Tullsen, D.M., et al., "Exploiting Choice: Instruction Fetch and Issue on an Implementable Simultaneous Multithreading Processor, " submitted to Proc. 23rd Annual International Symposium on Computer Architecture, pp. 1–22 Nov., 1995.

Cekleov, M, and Dubois, M., "Vitual–Address Caches Part 1: Problems and Solutions in Uniprocessors," in IEEE Micro 1997, pp. 64–71 Sept./Oct. 1997.

Sites, R.L. and Witek, R. T., "Alpha AXP Architecture Reference Manual, 2nd Edition", p. 11–A 3–12, 1995.

Sites, R. L. and Witek, r. T., "Alpha AXP Architecture Reference Manual, 2nd Edition", p. 11–A 3–5, 1995.

* cited by examiner

Primary Examiner—Reginald G. Bragdon
(74) Attorney, Agent, or Firm—Hamilton, Brook, Smith & Reynolds, P.C.

(57) ABSTRACT

A method of accessing information in a cache of a multi-threaded system comprises providing a virtual address of an instruction to be accessed by a thread. Upon a cache miss, the physical address of the information is compared with the physical address of an instruction stored in the cache, and if they match, the instruction is accessed from the cache. Alternatively, the cache is searched for an entry having a virtual address which matches the instruction's virtual address, and having some indication of being associated with the accessing thread. Upon finding such an entry, the instruction is accessed from the cache. In addition, the instruction may be accessed from the cache upon finding a cache entry whose virtual address matches the instruction's virtual address, and which either has an address space matching the address space of the thread, or has an indication that the entry matches all address spaces. A translation lookaside buffer (TLB) maps the accessed instruction's virtual address to a physical address upon a miss. The cache entry's virtual address may also mapped to a physical address by the TLB, whose look-up key comprises a virtual address and an address space identifier. A thread indication in a cache entry, corresponding to the accessing thread, is set when a cache miss is detected, where the physical addresses of the accessed instruction and the cache entry match. When this occurs, the instruction is accessed from the cache.

44 Claims, 4 Drawing Sheets

METHOD AND APPARATUS TO SHARE INSTRUCTION IMAGES IN A VIRTUAL CACHE

BACKGROUND OF THE INVENTION

Single-threaded microprocessors are defined by the fact that, although multiple "concurrent" processes appear to be running simultaneously, in reality, only one process or thread of execution is actually running at any time. This distinction becomes slightly blurred where multiple execution blocks, or arithmetic logic units (ALUs) can execute in parallel. In superscalar processors, multiple instructions may be issued and executed each cycle. Still, these instructions come from a single thread of execution. Simultaneous multithreaded processors, on the other hand, allow instructions from different threads to execute simultaneously.

FIG. 1 is a block diagram of a multithreaded instruction pipeline 10. Multiple program counters 12 (PCs) are maintained, one per thread. The example of FIG. 1 shows two PCs, one for each of two threads. The PCs are used to fetch instructions for their respective threads from the instruction cache 14 or other memory. The fetched instructions are queued up in the instruction queue 16 and then issued.

Registers within the virtual register files 18 are accessed as necessary for the issued instructions. The instructions are then sent to the execution box 20 for execution, which, in a superscalar architecture, may contain several arithmetic logic units (ALUs) which execute in parallel. Different ALUs may have different functions. For instance, some ALUs perform integer operations while others perform floating point operations. Finally, memory is accessed in block 22.

FIG. 2A is a chart illustrating a typical allocation 30 of ALU slots in a non-simultaneous multithreading superscalar processor. In this example, there are four ALUs, each represented by one of the four columns labeled 0–3. Instructions are allocated to ALUs as the ALUs become available. Thus, at time slot 32, two ALUs have been allocated. In the next cycle, time slot 34, three ALUs are allocated. However, there are many empty slots in which some of the ALUs sit idle, e.g., ALUs 2 and 3 in time slot 32. By allowing multiple threads to execute simultaneously, it is the goal of designers to fill these empty slots as often as possible to fully utilize the processor's resources.

FIG. 2B is a chart 40 similar to that of FIG. 2A, but illustrating the allocation of ALU slots in a simultaneous multithreading superscalar system. Allocated instructions associated with one thread, say thread 0, are indicated with a dot, while instructions associated with another thread, say thread 1, are indicated with an X. For example, in the time slot 42, ALUs 0 and 1 are allocated to instructions from thread 0, while ALUs 2 and 3 are allocated to instructions from thread 1. In time slot 44, ALUs 0, 1 and 3 are allocated to thread 0 while ALU 2 is allocated to thread 1.

While there may still be idle ALU slots, as in time slot 46, a comparison with FIG. 2A shows that idle ALU slots are far fewer in a simultaneous multithreading system. Thus, simultaneous multithreading systems are more efficient and, while not necessarily speeding up the execution of a single thread, dramatically speed up overall execution of multiple threads, compared to non-simultaneous multithreading systems.

FIG. 3 illustrates the concept of virtual to physical memory mapping. Typically, a program, or a thread, executes in its own virtual address space 50, organized into blocks called pages 52. Pages of physical memory 58 are allocated as needed, and the virtual pages 54 are mapped to the allocated physical pages 58 by a mapping function 54. Typically, this mapping function 54, or page list as it is more commonly known, is a large table stored in memory, requiring long memory access times.

To reduce these long lookup times, a relatively small cache, called a table lookaside buffer (TLB) is maintained. The TLB holds mappings for recent executing instructions with the expectation that these instructions will need to be fetched again in the near future. The TLB is generally a content-addressable memory (CAM) device having a virtual address as its lookup key.

During a context switch, in which the executing process is swapped out and replaced with another process, much of the cached memory used by the first process becomes invalid. However, some processes may use common instruction code. There are various methods for sharing code, such as mapping different virtual addresses from different address spaces to the same physical address. This is often done with system memory space.

SUMMARY OF THE INVENTION

In a cache system simultaneously executing multiple threads, some number of thread slots are available. When a process is swapped in, it may be swapped into any of the thread slots. Thus, a process can be thought of more as a software device, while a thread can be thought of as a hardware device with which any process may be associated for some length of time. Each thread executes in its own virtual address space. Since different processes may share code, threads may also share code. Of course, where two executing threads refer to the same virtual address within their own address spaces, but the mapped physical addresses are different, different cache entries are required. However, when the mapped physical addresses are the same, it is desirable to use the same cache entry. For example, this happens in many systems when multiple instances of the same program are executing.

In executing a virtual cache lookup, it is necessary to not only use the virtual address to look up an entry, but the address space identifier as well, since matching virtual addresses alone do not guarantee a proper cache entry. Thus, an address space number (ASN), which is a sort of abbreviated process identifier, is maintained in each cache entry. If the ASN of a retrieved cache entry matches the address space of the requesting thread, the cache entry is valid for that lookup. An address space match (ASM) bit may also be maintained in each entry to indicate that the entry is good for all address spaces. This is useful, for example, where the shared space is system space.

Instruction cache hit rate is an important component of performance, and by allowing instruction images to share cache capacity, hit rate is improved. A problem occurs, however, where the virtual addresses for different threads are the same and map to the same physical address. Where the stored ASN is different from a requesting thread's ASN, a cache miss unnecessarily results. A preferred embodiment of the present invention solves this problem by providing thread address space match (TASM) bit indicators.

In accordance with a preferred embodiment of the present invention, a method of accessing information in a cache of a multithreaded system comprises:

providing a virtual address to locate information for a thread; and upon a cache miss, comparing a physical address of the information with a physical address of information stored in the cache and, with a match of physical addresses, accessing the information from the cache.

In a preferred embodiment, the cache is searched for an entry having a virtual address which matches the virtual address of the information being accessed and having an indication of being associated with the thread which is accessing the information. Upon finding such an entry, the information is accessed from the cache. In addition, the information may be accessed from the cache upon finding an entry in the cache whose virtual address matches the information virtual address and which either has an address space matching the address space of the thread, or has an indication that the entry matches all address spaces.

Upon a cache miss, the accessed information's virtual address is mapped to a physical address. This is preferably performed by a translation lookaside buffer (TLB). In a preferred embodiment, the cache entry's virtual address is also mapped to a physical address, preferably by the TLB, whose look-up key comprises a virtual address and an address space identifier. Alternatively, the physical address of information stored in the cache may itself be stored in the entry. In either case, the physical address is preferably a physical page address.

In a preferred embodiment, the accessed information comprises an instruction. In an alternate embodiment, the information contains data.

A thread indication in a cache entry, corresponding to the accessing or requesting thread, is set when a cache miss is detected, but the physical addresses of the accessed or requested information and the cache entry are found to match. Preferably, when this occurs, the information is accessed from the cache.

Thread indications may be reset many ways, including during a cache fill operation. They may be reset individually, by thread, or collectively as a whole.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

In a multithreading system, each thread has a distinct mapping of its virtual addresses to physical addresses. With a shared cache indexed by virtual addresses, a hit requires not only that a cache entry have the requested virtual address, but that the entry be for the same process. Sites and Witek, "Alpha AXP Architecture Reference Manual, 2nd Edition", p.II-A 3–12, 1995, discuss address space numbers (ASNs), or process tags, as a means of reducing the need for invalidation of cached address translations for process-specific addresses when a context switch occurs. In addition, they introduce the concept, at p. II-A 3–5, of an address space match (ASM) bit to indicate that an address matches all ASNs. Such a bit might be used, for example, for system space which is common to all processes.

Figure 1:
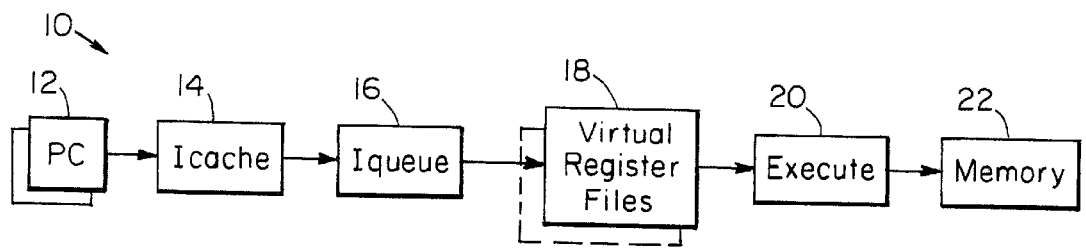
FIG. 1 is a block diagram of a multithreaded instruction pipeline.
Figure 2A:
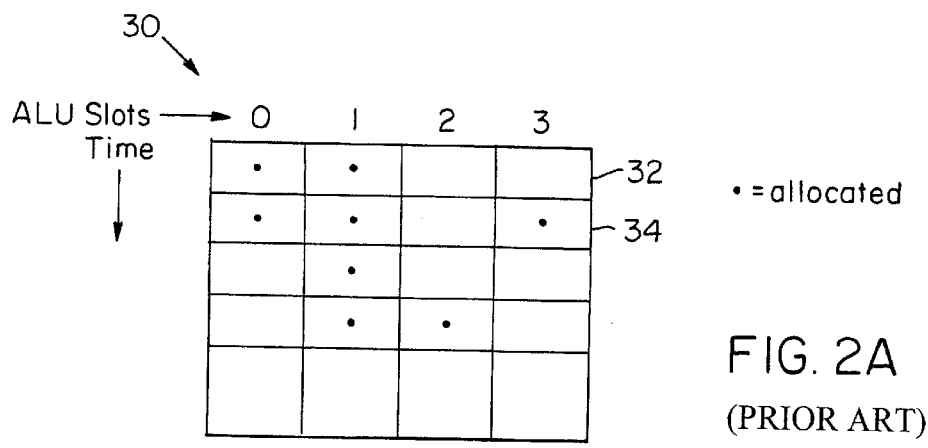
FIG. 2A is a chart illustrating the allocation of arithmetic logic unit (ALU) or execution slots, in a non-simultaneous multithreading superscalar system.
Figure 2B:
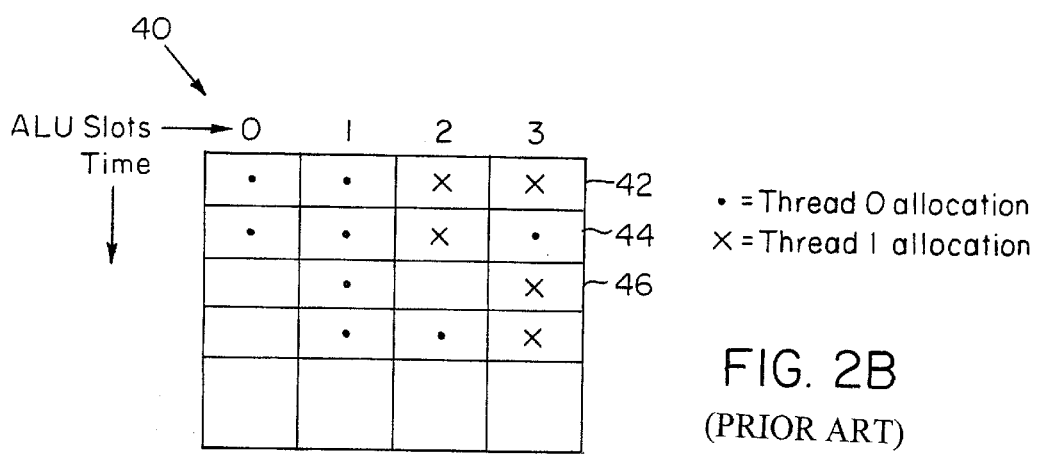
FIG. 2B is a chart illustrating the allocation of ALU slots in a simultaneous multithreading superscalar system.
Figure 3:
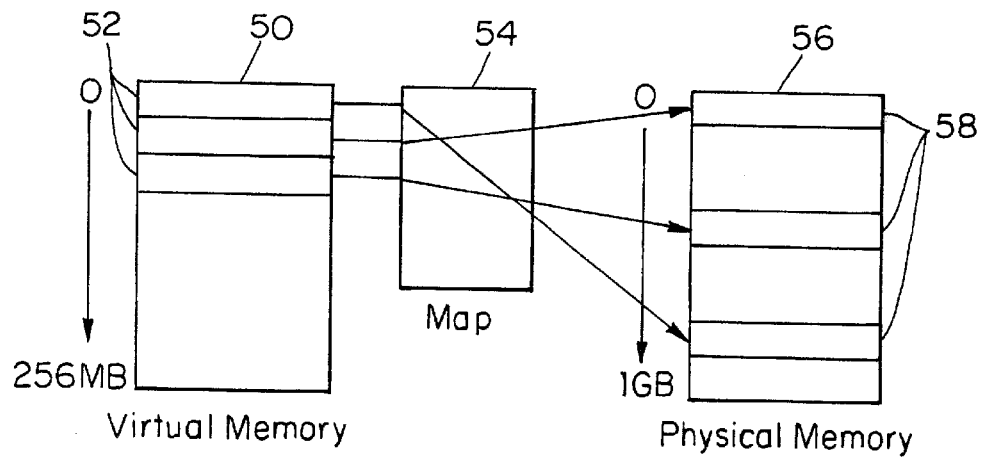
FIG. 3 is a block diagram illustrating virtual to physical memory mapping.
Figure 4:
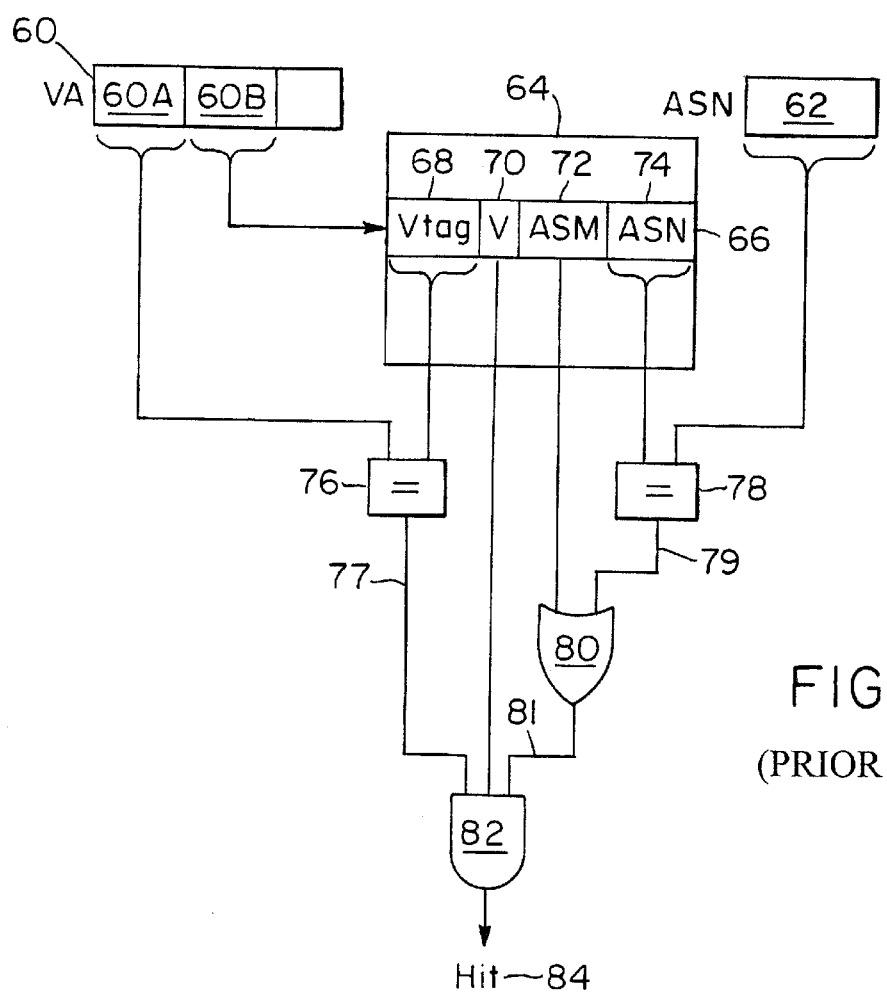
FIG. 4 is a schematic diagram illustrating a manner of detecting a cache hit in a processor having a virtual instruction cache, according to the prior art.

FIG. 4 illustrates a manner of detecting a cache hit in a system having a virtual instruction cache 64, according to the prior art. An index portion 60B of the virtual address 60 of the instruction being fetched is used to retrieve an entry 66 from the cache 64. The entry 66 includes a virtual tag 68, a valid bit 70, an ASM bit 72 and an ASN corresponding to the process for which this entry has been saved in the cache. The ASM bit is set if the virtual address is shared by all processes in identifying a common physical address, such as is generally the case for system memory space.

The tag 68 returned by the cache 64 is compared against the tag portion 60A of the virtual address at comparator 76, to look for a match of virtual addresses. Similarly, the cache entry's ASN 74 is compared, at comparator 78, with the ASN 62 of the process which is fetching the instruction. The result 79 of the ASN comparison is ORed with the cache entry's ASM bit 72 at OR gate 80. The OR gate's output 81 therefore provides an indication that either the ASNs match, or that all address spaces match this particular entry.

Finally, the OR gate's output 81 is ANDed with the valid bit 70 and the virtual address comparator output 77 at AND gate 82. The result 84 is an indication of a cache miss, where the entry's instruction (not shown) does not correspond with the desired instruction, or a cache hit.

This simplified cache tag compare can be written as:

$$\text{Hit}=(\text{Virtual tag}[\text{access}]=\text{Virtual tag}[\text{cache}]) \;\&\&\; (\text{Valid}) \;\&\&\; ((\text{ASN}[\text{process}]=\text{ASN}[\text{cache}])\|\text{ASM}[\text{cache}]). \quad \text{(Eq. 1)}$$

Here, the ASN[process] only changes upon a context switch.

Of course, the cache itself may be a multiple-way set associative cache, yielding multiple entries for a single index. In this case, the ideas discussed above are simply expanded such that multiple comparisons are performed.

Tullsen et al, "Simultaneous Multithreading: Maximizing on-chip parallelism", 22nd Annual International Symposium on Computer Architecture, June 1995, pp. 392–403, present the concept of simultaneous multithreading (SMT) and general architectural concepts. They further discuss implementation issues in "Exploiting Choice: Instruction Fetch and Issue on an Inplementable Simultaneous Multithreading Processor", 23rd Annual International Symposium on Computer Architecture, May 1996, pp. 191–202.

Of specific interest is that multiple programs share a processor's resources and execute simultaneously. SMT is mainly targeted at superscalar processors where execution units, or ALUs, are frequently idle due to lack of instruction level parallelism. This allows the different programs to efficiently time multiplex the execution units and dramatically increase the throughput of the system.

However, the programs all must share the instruction cache simultaneously, effectively reducing the cache capacity, which in turn increases the miss rate. Due to the use of ASNs in some operating systems, if multiple copies of the same image are running on the same SMT processor with a virtual instruction cache, they will not be able to share cache capacity. For many applications where SMT offers significant speed-up, the inability to share cache capacity can severely degrade performance.

In a SMT processor, Equation 1 becomes:

Hit=(Virtual tag[access]=Virutal tag[cache]) && (Valid) && ((ASN[thread]=ASN[cache])||ASM[cache]).   (Eq. 2)

The only difference between Equations 1 and 2 is in the subscript of ASN, indicating that there are multiple thread contexts "live" in the processor. In fact, there are as many contexts and ASNs stored in the processor as the number of hardware threads supported.

Code sharing can occur when two programs share the same physical addresses, regardless of virtual addresses. However, operating systems generally try to provide programs with the same virtual and physical addresses when code images are being shared. The programs are then differentiated by assigning them different ASNs. The present invention provides the ability for programs to share space in the instruction cache of a SMT processor when the programs share both virtual and physical addresses.

Figure 5:
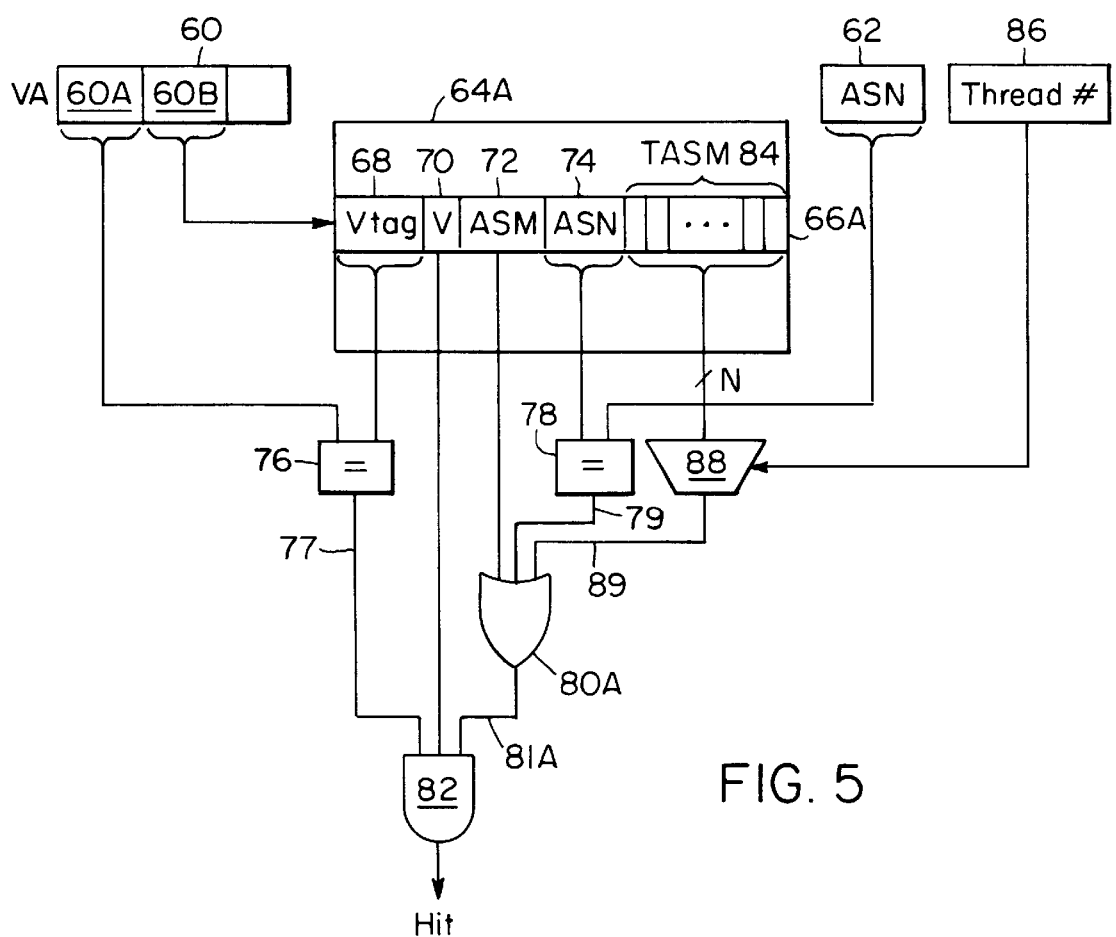
FIG. 5 is a schematic diagram illustrating a manner of detecting a cache hit in a multithreaded system, using thread indicators, or TASM bits, according to a preferred embodiment of the present invention.

FIG. 5 illustrates how a preferred embodiment of the present invention detects a cache hit in a multithreaded system, using thread indicators, or thread address space match (TASM) bits, while allowing different threads to access the same physical memory. Here, each entry in the cache 64A, such as indexed entry 66A, has a field 84 comprising a TASM bit for each of N live threads. The thread number 86 of the thread accessing the instruction is used to select the corresponding TASM bit by controlling a 1:N selector 88 where there are N TASM bits. The selected TASM bit 89 is then ORed with ASN comparator output 79 and the entry's ASM bit 72 at OR gate 80A. The output 81A of OR gate 80A is then ANDed with the entry's valid bit 70 and the virtual tag comparator output 77.

In effect, the sharing of code images in an instruction cache is supported by an extension of the 'Hit' equation of Eq. 2. The new equation is:

Hit=(Virtual tag[access]=Virutal tag[cache]) && (Valid) && ((ASN[thread]=ASN[cache])||ASM[cache]||TASM[thread])  (Eq. 3)

where TASM[thread] is the bit stored per thread for the entry in the cache 64A. If the selected TASM bit 89 is set for the referenced cache entry, then the ASN compare result 79 is ignored. Therefore, multiple threads can share cache entries using this mechanism.

To clarify this, consider the following sequence of cache references. First, thread 0 has ASN=0 and references virtual tag 0×1111. Address translation shows that the corresponding physical tag is Oxaaaa. The fetched instruction is placed into the cache with its associated ASM=0 and TASM[0]=0.

Second, thread 1 has ASN=1 and references virtual tag= 0×1111. Normally, this would be a cache miss, requiring a read from main memory, but translation shows that this reference has the same virtual and physical tag as the prior reference. TASM[1] is set 1, which indicates that thread 1 can, in future accesses to that virtual address by that thread, ignore the ASN compare. Threads 0 and 1 now share code in the instruction cache.

To set a TASM bit, the processor must determine that an accessed instruction 60 and a cache entry have the same virtual and physical addresses, e.g., tags. One way to accomplish this task is by storing physical tags in the instruction cache and making a single translation of the requested address for comparison. Another way is to provide dual translation, in which case both the virtual address in the cache entry and the virtual address of the accessed instruction must be translated. In either embodiment, after both physical addresses are acquired, a comparison is made. If both virtual and physical addresses match, then the TASM bit of the thread that just accessed the cache is set. In essence, the processor learns that the virtual addresses are equivalent through the initial cache access. Namely, the processor learns that the ASNs do not match but that the physical addresses do match. If the physical addresses do not match, a normal cache miss is handled.

Figure 6:
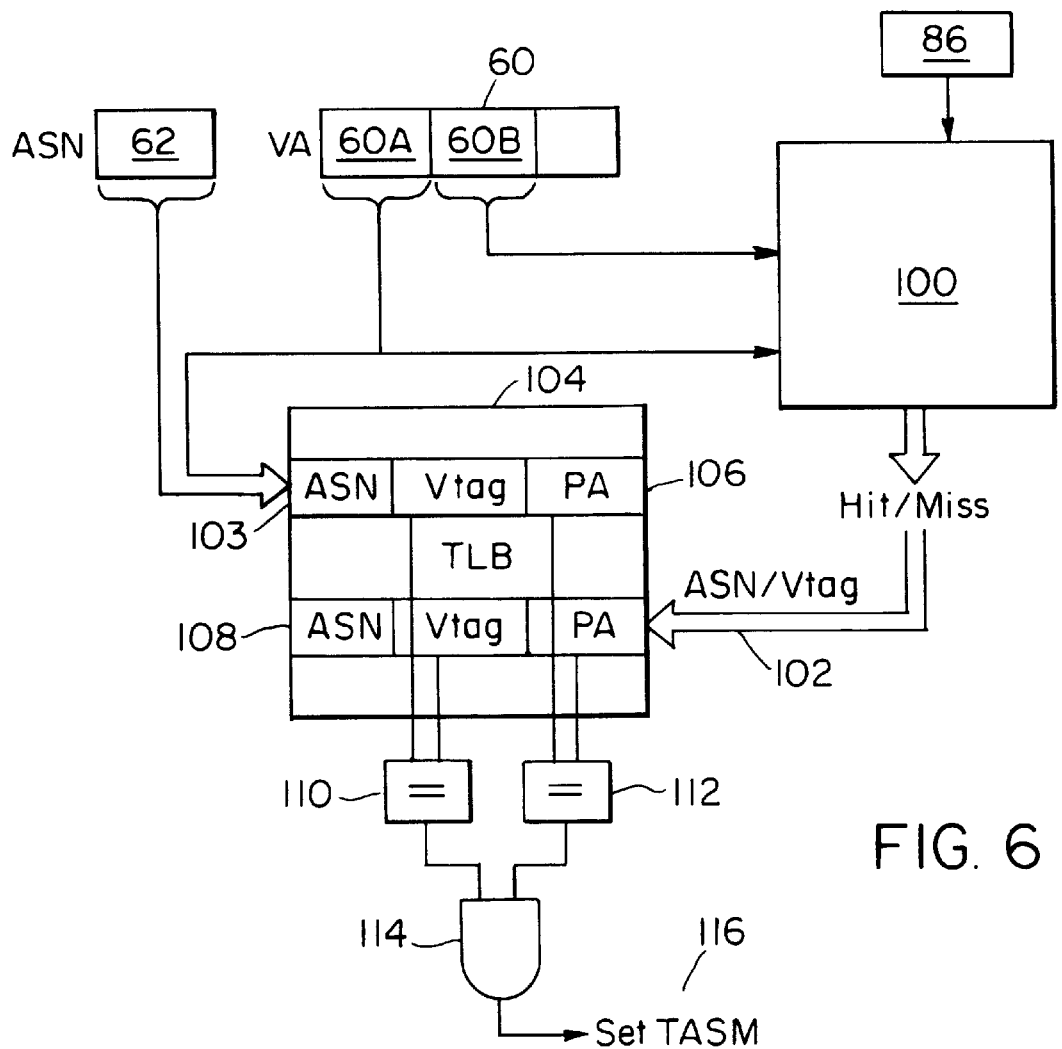
FIG. 6 is a schematic diagram illustrating, according to a preferred embodiment of the present invention, matching physical addresses to determine whether to set a thread indicator, or TASM bit.

FIG. 6 illustrates how TASM bits are set, according to a dual translation embodiment. Box 100 represents the cache 64A of FIG. 5 as well as the logic 76, 78, 80A, 82, 88 used to detect a cache hit. The translation lookaside buffer (TLB) 104 holds virtual to physical address mappings. A TLB entry, such as entry 106 or 108, comprises an ASN, a virtual address, and a physical address. The ASN and virtual address form the key for looking up entries in the TLB. Upon a cache miss, the TLB is presented with the ASN and virtual tag of a valid indexed entry, at 102, which select, in this example to TLB entry 108. In addition, the requested informations's ASN and virtual address are presented to the TLB at 103, and collectively select TLB entry 106.

The virtual tags of the selected TLB entries 106, 108 are compared at comparator 110, and the corresponding physical addresses are compared at comparator 112. The comparator results are ANDed at gate 114, and if both sets of addresses match, a signal 116 for setting the TASM of the corresponding thread at the virtual address entry is asserted. Note that comparator 110 is not actually required because it is known by virtue of a valid entry being found in the cache that the virtual addresses match. However, the virtual address must still be supplied at 102 as part of the TLB lookup key.

Of course, it will be obvious to one skilled in the art that the TLB entries may be retrieved serially or in parallel with appropriate supporting hardware. In addition, where a multiple-way set associative cache is used, providing multiple cache entries, multiple comparisons are performed at the TLB.

In order to prevent false cache hits, close attention must be paid to clearing the TASM bits. A TASM bit is cleared if the TLB translation that was used to set the bit changes or is invalidated. A thread's bits should also be cleared on a context switch, i.e., when a thread's ASN changes. TASM bits may be invalidated individually, by thread, or all collectively.

While this invention has been particularly shown and described with references to preferred embodiments thereof, it will be understood by those skilled in the art that various changes in form and details may be made therein without departing from the spirit and scope of the invention as defined by the appended claims. For example, the same principles apply to the caching of other information, such as data.

What is claimed is:

1. A method of accessing information in a cache of a multithreaded system, comprising:
   providing a virtual address to locate information for a thread; and
   upon a cache miss, comparing a physical address corresponding to the virtual address with a physical address of information stored in the cache and, with a match of physical addresses,
      setting a thread indication in the cache entry corresponding to the thread, and, accessing the information from the cache.

2. The method of claim 1 wherein the physical address is a physical page address.

3. The method of claim 1, further comprising:
upon finding an entry in the cache having a virtual addresses which matches the information virtual address, and having an indication of association with the thread, accessing the information from the cache without a miss.

4. The method of claim 3, further comprising:
upon finding an entry in the cache having a virtual address which matches the information virtual address, and having an address space which matches an address space associated with the thread, accessing the information from the cache without a miss.

5. The method of claim 3, further comprising:
upon finding an entry in the cache having a virtual addresses which matches the information virtual address, and having an indication that the entry matches all address spaces, accessing the information from the cache without a miss.

6. The method of claim 1, further comprising storing, in a cache entry, the physical address of information stored therein.

7. The method of claim 1, further comprising upon a miss, mapping the information virtual address to a physical address.

8. The method of claim 7 wherein mapping the information virtual address is performed by a translation lookaside buffer (TLB).

9. The method of claim 7, further comprising:
mapping a cache entry virtual address to a physical address.

10. The method of claim 9 wherein mapping the information virtual address, and mapping the cache entry virtual address are performed by a translation lookaside buffer (TLB).

11. The method of claim 10 wherein a key to the TLB comprises a virtual address and an address space identifier.

12. The method of claim 1, wherein the information comprises an instruction.

13. The method of claim 1, further comprising:
upon setting the thread indication, accessing the information from the cache.

14. The method of claim 1, further comprising:
resetting a cache entry's thread indication during a cache fill operation.

15. The method of claim 1 wherein thread indications may be reset individually.

16. The method of claim 1 wherein all thread indications associated with a thread may be reset together.

17. A method of accessing information in a cache of a multithreaded system, comprising:
maintaining, for each entry in a cache and for each of plural threads of execution, a thread match indication of whether the entry matches an address space of the thread;
providing a virtual address from an executing thread;
finding a matching entry in the cache having a virtual address which matches the provided virtual address and having a thread match indication which indicates a match with the executing thread; and
accessing the information from the matching entry of the cache.

18. The method of claim 17, further comprising:
upon finding an entry in the cache having a virtual address which matches the information virtual address, and having an indication that the entry matches all address spaces, accessing the information from the cache.

19. The method of claim 17, further comprising:
providing a virtual address to locate information for a thread; and
upon a cache miss, comparing a physical address of the information with a physical address of information stored in the cache and, with a match of physical addresses, accessing the information from the cache.

20. The method of claim 19, further comprising:
upon setting the thread indication, accessing the information from the cache.

21. A virtual cache system for accessing information in a multithreaded system, comprising:
a cache comprising a plurality of entries, each of which is indexed by a virtual address corresponding to information stored in the entry for a thread, wherein each entry comprises a thread indication corresponding to a thread; and
a comparator for comparing, upon a cache miss, a physical address corresponding to a virtual address with a physical address of information stored in the cache such that, upon a match of physical address, the corresponding thread indication is set and the information is accessed from the cache.

22. The virtual cache system of claim 21, wherein, upon finding an entry in the cache having a virtual address which matches the information virtual address, and having an indication of association with the thread, the information is accessed from the cache without a miss.

23. The virtual cache system of claim 22, wherein, upon finding an entry in the cache having a virtual address which matches the information virtual address, and having an address space which matches an address space associated with the thread, the information is accessed from the cache without a miss.

24. The virtual cache system of claim 22, wherein, upon finding an entry in the cache having a virtual addresses which matches the information virtual address, and having an indication that the entry matches all address spaces, the information is accessed from the cache without a miss.

25. The virtual cache system of claim 21, wherein the physical address of information stored in a cache is itself stored therein.

26. The virtual cache system of claim 21, further comprising a map for mapping the information virtual address to a physical address.

27. The virtual cache system of claim 26 wherein the map comprises a translation lookaside buffer (TLB).

28. The virtual cache system of claim 27, wherein the TLB also maps a cache entry virtual address to a physical address.

29. The virtual cache system of claim 28 wherein a TLB's key comprises a virtual address and an address space identifier.

30. The virtual cache system of claim 21, wherein the information comprises an instruction.

31. The virtual cache system of claim 21, wherein the information is accessed from the cache when the thread indication is set.

32. The virtual cache system of claim 21, wherein a thread indication is reset when a context switch replaces a process associated with the indicated thread.

33. A multithreaded computer system, comprising:
- a virtual cache comprising a plurality of entries, each of which is addressed by a virtual address corresponding to information stored in the entry for a thread, wherein each entry comprises a thread indication corresponding to a thread; and
- a comparator for comparing, upon a cache miss, a physical address of requested information with a physical address of cached information, such that, upon a match of physical addresses, the corresponding thread indication is set and the requested information is accessed from the cache.

34. The multithreaded computer system of claim 33, wherein each cache entry further comprises:
- a thread indication indicating which of a plurality of threads is associated with the cache entry, such that upon finding a valid entry in the cache addressed by the requested information virtual address, the requested information is accessed from the cache if the entry's thread indication indicates a requesting thread.

35. The multithreaded computer system of claim 34, wherein each cache entry further comprises:
- an address space identifier, such that upon finding a valid entry in the cache addressed by the requested information virtual address, the requested information is accessed from the cache if the entry's address space identifier matches the requesting thread's address space.

36. The multithreaded computer system of claim 34, wherein each cache entry further comprises:
- an address space match indication, such that upon finding a valid entry in the cache addressed by the requested information virtual addresses, the requested information is accessed from the cache if the entry's address space match indication indicates that the entry matches all address spaces.

37. The multithreaded computer system of claim 34, further comprising a map for mapping the requested information virtual address to a physical address.

38. The multithreaded computer system of claim 34, wherein the information comprises an instruction.

39. The multithreaded computer system of claim 33, wherein the requested information is accessed from the cache when the thread indication is set.

40. A multithreaded computer system, comprising:
- virtual cache means;
- means for providing a virtual address of requested information to the virtual cache means; and
- comparator means for comparing, upon a cache miss, the requested information physical addresses with a cached information physical address, such that, upon a match of physical address, a thread indication means corresponding to the requesting thread is set, and the requested information is accessed from the cache means.

41. The multithreaded computer system of claim 40, wherein the cache means further comprises:
- a plurality of entry means, each entry means comprising a thread indication means for indicating which of a plurality of threads is associated with the entry means such that upon finding a valid entry means addressed by the requested information virtual address, the requested information is accessed from the cache means if the entry means' thread indication means indicates a requesting thread.

42. The multithreaded computer system of claim 40, wherein the cache means further comprises:
- a plurality of entry means, each entry means comprising an address space identifier means, such that upon finding a valid entry means addressed by the requested information virtual address, the requested information is accessed from the cache means if the entry means' address space indicator means matches the requesting thread's address space.

43. The multithreaded computer system of claim 42, further comprising:
- map means for mapping the requested information virtual address to a physical address.

44. The multithreaded computer system of claim 40, wherein the requested information is accessed from the cache means when the thread indication is set.

* * * * *